United States Patent Office 3,278,504
Patented Oct. 11, 1966

3,278,504
HOT MELT ADHESIVE FOR BOOKBINDING BASED ON THE COPOLYMERS OF BUTENE-1 AND PROPYLENE
Rex Eells and Marion O. Brunson, Kingsport, Tenn., assignors to Eastman Kodak Company, Rochester, N.Y., a corporation of New Jersey
No Drawing. Filed Feb. 12, 1965, Ser. No. 432,398
3 Claims. (Cl. 260—88.2)

This application is a continuation-in-part of our U.S. patent application Serial No. 114,017, filed June 1, 1961, now abandoned.

This invention concerns hot melt adhesives for bookbinding, more particularly copolymers of butene-1 and propylene.

In the bookbinding field, it has been customary to use an aqueous adhesive such as glue or the like in order to attach pages to the binding. In some instances, the pages have been stapled together and the stapled sections glued to the binding by means of a fabric covering which gives additional strength to the binding. This type of binding has been used particularly with paper-covered editions and magazines. However, the water in the adhesive must be absorbed or evaporated, requiring a period of time for the glue to set so that the books or magazines can be distributed.

The use of aqueous adhesives, which require a period of time for setting, has resulted in shifting of the binding and the need for repair work and a high degree of inspection to determine that the books are in satisfactory condition.

In view of the difficulties experienced with aqueous type adhesives, it has been desirable to obtain an adhesive which could be used in a molten condition, free from water or other volatile solvents and which would set up rapidly, requiring only a few seconds. Although this concept has been recognized, it has been difficult to obtain a suitable hot melt adhesive which would have the desirable characteristics to result in what is known as a "perfect binding."

In a "perfect binding" the adhesive performs several functions:

(1) It bonds every page individually.
(2) It attaches the cover.
(3) It holds the whole book together without stitching or side staples.

The adhesive film must withstand the flexing that occurs when the book is opened, and it must not crack under the severe flexing that takes place when the book is bent back on itself.

The following properties are required: the adhesive must be stable at the application temperature, must adhere quickly, and have good adhesion to various types of surfaces, including coated papers, must be moisture resistant and relatively unaffected by humidity or the like, must have excellent storage stability, remaining flexible over a long period of time, and must be recoverable with waste paper.

We have found a synthetic polymeric material which can be used for a bookbinding adhesive in the molten state which has the desired properties.

One object of this invention is to provide a hot melt adhesive for bookbinding purposes. Another object is to provide a hot melt adhesive for bookbinding which is flexible at both normal and low temperatures. An additional object is to provide an easily applicable hot melt adhesive for bookbinding, which can be used as a substitute for aqueous type glues and adhesives with a saving in time and equipment. A further object is to provide a hot melt adhesive which has good stability to the temperatures required for its application and for the life of the book, retaining its flexibility for the life of the book.

The above objects are attained using a copolymer of propylene and butene-1.

The copolymers which are useful in our invention are obtained either (1) by direct copolymerization of butene-1 with propylene, or (2) by copolymerization of butene-1 with propylene followed by thermal treatment as described in the examples below. Polymerization is carried out, as described in Guillet et al. U.S. patent application Serial No. 954, filed January 7, 1961 (abandoned in favor of Serial No. 277,445, filed May 2, 1963), corresponding to French Patent 1,277,292, with ionic catalysts made from combinations of metal alkyls with transition element halides such as aluminum, triethyl-titanium tetrachloride, aluminum isobutyl-titanium tetrachloride, or metal oxides such as chromia or molybdena, or a support such as $\alpha$-alumina or silica alumina. Crystalline copolymers are thereby directly obtainable suitable for use in our invention which are wax-like products characterized by having melting points greater than about 100° C., densities of about 0.88 to 0.93 and molecular weights of from about 1000 to 20,000. However, polymerization in this manner can readily yield copolymers of molecular weights of at least 20,000 up to 1,000,000 or more and densities below 0.93 (ASTM-D1505). Because of the difficulty in determining absolute molecular weights, the inherent viscosities of the resin or wax in tetralin at 145° C. is often used to indicate molecular weight. A typical procedure for inherent viscosity determination is set forth in "Journal of Polymer Science," vol. 26, p. 227 (1957). A molecular weight of 20,000 corresponds to an inherent viscosity in tetralin at 145° C. of about 1. Accordingly, these high molecular weight copolymers are converted in high yields to high softening wax-like compositions by thermal treatment in the absence of air at temperatures above 250° C. and preferably between 300 and 450° C. The thermal treatment may be carried out in a vacuum or in an inert gas, in bulk or in the presence of a suitable diluent such as hexane, mineral spirits, benzene, xylene, etc. The crystalline products are also characterized by having melting points greater than 100° C., densities between 0.88 and 0.93, and molecular weights ranging from 1,000 to 20,000.

The relative proportions of the monomers may range from about 30–70% butene-1 to 70–30 propylene. A preferred composition has a 50–50% composition. Certain other $\alpha$-olefins may be polymerized with butene-1 and propylene, providing that the $\alpha$-olefins have from 2–10 carbon atoms and provided that the relative proportions of the other $\alpha$-olefin is no greater than 20% of the resultant polymer.

Blends of the copolymers useful in our invention with other materials such as polyalpha olefins, modified and unmodified polyterpenes, and petroleum resins may be used in some instances provided at least 80% of the adhesive mixture is the copolymer of butene-1 and propylene as described above.

The following examples will serve to illustrate the preparation of representative polymers having the mentioned properties and their use as bookbinding adhesives.

EXAMPLE 1

*Preparation of adhesive by direct polymerization*

Several copolymers within the mentioned range of melting point, density and molecular weight are prepared in a four liter, rocking autoclave. The catalyst is an equimolar mixture of $Et_2AlCl$ and $TiCl_3$ which is added to the solvent in a dry box and then transferred to the autoclave. The monomers are metered into the autoclave as liquids under pressure. Hydrogen is used to control the molecular weight and the polymerization is carried out at 85° C. for four hours. Isobutyl alcohol is pumped into the autoclave to quench the reaction and the copolymer is worked up by washing with hot isobutyl alcohol. A Waring Blendor is used to insure good contact of the polymer and alcohol. The polymer wax is filtered, washed with methyl alcohol and dried in a 50° C. air oven. The final product is a fine powder. The yields and several properties of a number of propylene-butene-1 copolymer waxes are shown in the following table.

| Catalyst | | Solvent | | Monomers | | Hydrogen, p.s.i. | Yield, g. | Percent 1-butene, by weight | Inherent Viscosity in Tetralin at 145° C. | Density (ASTM D1505) | M.P., °C. |
|---|---|---|---|---|---|---|---|---|---|---|---|
| Et$_2$AlCl, g. | TiCl$_3$, g. | Mineral Spirits, ml. | n-Heptane, ml. | C$_3$H$_6$, g. | C$_4$H$_8$, g. | | | | | | |
| 2.02 | 2.58 | 920 | ------ | 276 | 184 | 40.0 | 417 | 40.0 | 0.26 | 0.892 | 125 |
| 4.04 | 5.16 | 1,160 | ------ | 552 | 368 | 60.0 | 938.0 | 55.0 | 0.22 | 0.889 | 112 |
| 4.04 | 5.16 | 920 | ------ | 276 | 184 | 30.0 | 445.0 | 53.0 | 0.39 | 0.889 | 114 |
| 2.02 | 2.58 | ------ | 920 | 230 | 230 | 30.0 | 490.0 | 60.0 | 0.35 | 0.891 | 120 |
| 2.02 | 2.58 | ------ | 920 | 385 | 95 | 30.0 | 452.0 | 26.0 | 0.36 | 0.896 | 114 |

EXAMPLE 2

*Preparation of adhesive by thermal treatment of copolymer*

One gram of a catalyst consisting of a 1:1 molar ratio of TiCl$_3$ and diethyl aluminum chloride is dispersed in 250 ml. dry heptane in a pressure bottle under nitrogen. The bottle is heated to 70° C., then pressured with 30 p.s.i. propylene. The polymerization is allowed to proceed until about 10 grams of propylene has been absorbed, after which the bottle is pressured with 10 p.s.i. butene-1 and allowed to react until 5 grams of butene-1 has been absorbed. The reaction is then terminated by injection of 10 cc. isobutyl alcohol. The polymer is worked up by washing three times with hot isobutanol and drying in an air oven. The yield of polymer is 14.4 g. with an inherent viscosity of 3.2 in tetralin at 145° C., a density of 0.905 and a butene-1 content of 29.1%. This polymer is converted to a wax by heating in a Pyrex tube under vacuum for one-half hour at 385° C. The wax has a penetration hardness of 1 (100 g. load/5 sec./77° C.), a melt viscosity of 3900 cp. at 190° C., I.V. 0.3, molecular weight about 3,000 to 5,000 and a density of 0.91. When coated on a ferrotype plate and quenched with ice water, it gives a clear-tough film which does not crack after five cycles of folding.

EXAMPLE 3

The pages of pocket novels were clamped together and manually bound with a melted 1:1 copolymer of butene-1 and propylene prepared as described in Example 2 and having a softening or melting point of 130° C., a viscosity of about 18,000 cps. at 190° C. (melt index method), density of about 0.90 and molecular weight of about 5,000, by melting the copolymer at about 150-200° C. and applying it to the flush edges of the pages. The pocket novels were found to have flexible bindings which remain flexible when the covers were bent back touching each other and remained flexible when exposed to accelerated aging tests, including temperature tests at 0° F. and including exposure to an atmosphere of 100% relative humidity.

EXAMPLE 4

Pocket novels are manually bound at a temperature of 150-200° C. as described in Example 1, using a blend of 85% of the copolymer used in Example 1 mixed with 15% of a similar copolymer of butene-1 and propylene in the ratio of 1:1, except having a melt viscosity of 2,900 c.p.s. at 190° C.

Similar tests of the binding for flexibility, stability and the like were made as in Example 1 and found to be satisfactory.

Suitable paper recovery properties can be obtained using our bookbinding adhesives with the incorporation in the polymer of a surfactant such as sorbitan trioleate or the like, or similar material. The incorporation of these surfactants will not adversely affect the desirable properties of the bookbinding adhesive, but will permit the polyolefin to be emulsified in a paper recovery system wherein sodium hydroxide is employed.

It will be appreciated that the polymer described herein is more resistant to attack by micro-organisms, such as fungi, or the like, than glue or the like.

Use of our hot melt adhesive permits high speed bookbinding, since it is not necessary to have a setting or storage period for bound books following the adhesive step. The highly increased production rate more than compensates for the slight increased cost of the adhesive from which also results in a bound volume which is superior in important characteristics such as flexibility, stability and the like.

Herein molecular weight can be determined, as mentioned above, from inherent or intrinsic viscosities, melting or softening point in degrees C. by the ring and ball method (ASTM E28-58T) and density by the density gradient tube method (ASTM D1505).

The invention has been described in detail with particular reference to preferred embodiments thereof, but it will be understood that variations and modifications can be effected within the spirit and scope of the invention as described hereinabove and as defined in the appended claims.

What we claim is:

1. A book, the pages of which are bound together by means of a hot-melt composition comprising a copolymer of from about 30-70% butene-1 and from about 70-30% propylene having a crystalline melting point greater than 100° C., density between 0.88 and 0.93 and molecular weight of from about 1,000 to 20,000.

2. The book designated in claim 1 wherein the copolymer is a 1:1 copolymer of butene-1 and propylene.

3. The book designated in claim 1 wherein the copolymer comprises at least 85% of the hot-melt composition.

No references cited.

JOSEPH L. SCHOFER, *Primary Examiner.*

L. EDELMAN, *Assistant Examiner.*